United States Patent
Chew et al.

(10) Patent No.: US 10,091,979 B2
(45) Date of Patent: Oct. 9, 2018

(54) DUAL-BEARING REEL AND REEL UNIT FOR SAME

(71) Applicant: Shimano Components (Malaysia) SDN. BHD., Pontian, Johor (MY)

(72) Inventors: Chun Wee Chew, Johor (MY); Keigo Kitajima, Johor (MY)

(73) Assignee: SHIMANO COMPONENTS (MALAYSIA) SDN. BHD., Pontian, Johor (MY)

( * ) Notice: Subject to any disclaimer, the term of this patent is extended or adjusted under 35 U.S.C. 154(b) by 322 days.

(21) Appl. No.: 15/059,436

(22) Filed: Mar. 3, 2016

(65) Prior Publication Data
US 2016/0302400 A1    Oct. 20, 2016

(30) Foreign Application Priority Data
Apr. 15, 2015  (JP) .................................. 2015-083335

(51) Int. Cl.
| | | |
|---|---|---|
| A01K 89/01 | (2006.01) | |
| A01K 89/015 | (2006.01) | |
| A01K 89/00 | (2006.01) | |

(52) U.S. Cl.
CPC ........ *A01K 89/0193* (2015.05); *A01K 89/006* (2013.01); *A01K 89/015* (2013.01); *A01K 89/0192* (2015.05); *A01K 89/01925* (2015.05)

(58) Field of Classification Search
CPC .............. A01K 89/015; A01K 89/0192; A01K 89/01925
See application file for complete search history.

(56) References Cited

U.S. PATENT DOCUMENTS

| | | | | | |
|---|---|---|---|---|---|
| 1,905,483 | A | * | 4/1933 | Maynes | ............... A01K 89/015 242/249 |
| 2,649,257 | A | * | 8/1953 | Shelburne | ............ A01K 89/015 242/227 |
| 3,558,101 | A | * | 1/1971 | Ward | .................... A01K 89/015 24/68 R |
| 4,520,971 | A | * | 6/1985 | Nagata | ................. A01K 89/015 192/18 R |
| 4,821,978 | A | * | 4/1989 | Kaneko | ................ A01K 89/015 242/310 |

(Continued)

FOREIGN PATENT DOCUMENTS

JP           5258688 B2    5/2013

*Primary Examiner* — Emmanuel M Marcelo
(74) *Attorney, Agent, or Firm* — United IP Counselors, LLC (57) ABSTRACT

The present reel unit is a reel unit for a dual-bearing reel supporting a spool in a rotatable state. The reel unit includes a frame, a fishing rod attachment leg and a thinned part. The frame includes a first side plate, a second side plate disposed in opposition to the first side plate to enable the spool to be disposed between the first side plate and the second side plate, and a plurality of coupling members integrally formed with the first side plate and the second side plate to couple the first side plate and the second side plate. The fishing rod attachment leg is fixed to an outer surface of one of the plurality of coupling members. The thinned part has a box-like recessed shape and is formed on an inner surface, faced to the spool, of the coupling member to which the fishing rod attachment leg is fixed.

18 Claims, 7 Drawing Sheets

(56) References Cited

U.S. PATENT DOCUMENTS

| | | | | |
|---|---|---|---|---|
| 5,598,983 | A * | 2/1997 | Sato | A01K 89/015 |
| | | | | 242/261 |
| 5,775,614 | A * | 7/1998 | Yamaguchi | A01K 89/015 |
| | | | | 242/261 |
| 6,464,158 | B1 * | 10/2002 | Sakurai | A01K 89/006 |
| | | | | 242/283 |
| 2002/0060258 | A1 * | 5/2002 | Ikuta | A01K 89/015 |
| | | | | 242/310 |
| 2008/0173745 | A1 * | 7/2008 | Takechi | A01K 89/015 |
| | | | | 242/321 |
| 2010/0006688 | A1 * | 1/2010 | Ikuta | A01K 89/033 |
| | | | | 242/297 |
| 2010/0006689 | A1 * | 1/2010 | Ikuta | A01K 89/033 |
| | | | | 242/306 |
| 2011/0180647 | A1 * | 7/2011 | Niitsuma | A01K 89/033 |
| | | | | 242/307 |
| 2012/0056028 | A1 * | 3/2012 | Kawasaki | A01K 89/033 |
| | | | | 242/267 |
| 2014/0263791 | A1 * | 9/2014 | Sabtu | A01K 89/01 |
| | | | | 242/224 |
| 2015/0189865 | A1 * | 7/2015 | Umezawa | A01K 89/015 |
| | | | | 242/236 |

* cited by examiner

DUAL-BEARING REEL AND REEL UNIT FOR SAME

CROSS-REFERENCE TO RELATED APPLICATIONS

This application is based upon and claims the benefit of priority to Japanese Patent Application No. 2015-083335, filed on Apr. 15, 2015, the entirety of which is incorporated herein by reference.

BACKGROUND

Technical Field

The present specification relates to a dual-bearing reel and a reel unit for the same.

Description of Background Information

There has been known a type of frame of a reel unit for a dual-bearing reel that includes a pair of first and second side plates made of a metal, and a plurality of coupling members integrally formed with, and thus coupling, the first and second side plates (see e.g., Japan Patent No. 5258688). In the reel unit for the well-known dual-bearing reel, a fishing rod attachment leg is fixed to one of three coupling members so as to attach the dual-bearing reel to a fishing rod. In the coupling member to which the fishing rod attachment leg is fixed, the inner surface disposed closer to a spool is machined in a circular-arc shape, whereas the outer surface is machined in a flat shape. The other two coupling members are disposed in front and rear parts of the reel unit, and the inner and outer surfaces of those coupling members are machined in circular-arc shapes. The coupling members respectively have circular through holes bored for weight reduction. The fishing rod attachment leg is fixed to the aforementioned one of the coupling members by, for instance, swaging with four rivets.

In the reel unit for the well-known dual-bearing reel, one of the coupling members, to which the fishing rod attachment leg is fixed, has through holes bored for weight reduction. However, the effect of weight reduction is low when the diameter of and/or the number of the through holes are small. By contrast, when the diameter of and/or the number of the through holes are increased for enhancing the effect of weight reduction, chances are that the strength required for the coupling member cannot be reliably achieved.

BRIEF SUMMARY

It is an object of the present specification to reduce the weight of a coupling member to which a fishing rod attachment leg is fixed, and simultaneously, reliably achieve the strength required for the coupling member in a reel unit for a dual-bearing reel.

A reel unit for a dual-bearing reel according to the present specification is a reel unit for a dual-bearing reel supporting a spool in a rotatable state. The reel unit includes a frame, a fishing rod attachment leg and a thinned part. The frame includes a first side plate, a second side plate disposed in opposition to the first side plate to enable the spool to be disposed between the first side plate and the second side plate, and a plurality of coupling members integrally formed with the first side plate and the second side plate to couple the first side plate and the second side plate. The fishing rod attachment leg is fixed to an outer surface of any one of the plurality of coupling members. The thinned part has a box-like recessed shape and is formed on an inner surface, faced to the spool, of the coupling member to which the fishing rod attachment leg is fixed.

In the present reel unit for a dual-bearing reel, the first side plate and the second side plate are integrally formed, and the thinned part having a box-like recessed shape, is formed on the inner surface of the coupling member to which the fishing rod attachment leg is fixed. An edge, having a large thickness, is formed in the surroundings of the thinned part having a box-like recessed shape, and is integrally formed with the bottom, having a small thickness, of the thinned part. Hence, compared to a through hole, degradation in bending strength does not occur in the thinned part. Therefore, it is possible to reduce the weight of the coupling member to which the fishing rod attachment leg is fixed, and simultaneously, to reliably achieve the strength required for the coupling member.

The reel unit can further include a cover member disposed in at least a part of the thinned part. In this case, even in the construction that the cover member is disposed in the thinned part, it is possible to reduce the total weight of the cover member and the coupling member including the thinned part by producing the cover member made of a synthetic resin having a smaller specific gravity than metal. Additionally, the cover member is disposed in at least a part of the thinned part. Hence, grease can be accumulated in the interior of the cover member in order to prevent galvanic corrosion.

Each of the first side plate and the second side plate can include an outer peripheral surface having a circular shape. In this case, it is possible to reduce the weight of the coupling member to which the fishing rod attachment leg is fixed, and simultaneously, to reliably achieve the strength required for the coupling member in the round reel unit.

The plurality of coupling members can include a first coupling member and at least one second coupling member. The first coupling member corresponds to the coupling member to which the fishing rod attachment leg is fixed. The first coupling member can include the inner surface having a circular-arc shape and the outer surface that is located on the opposite side of the inner surface and is made in the form of a flat surface arranged orthogonally to a radial direction. The second coupling member can include an inner surface having a circular-arc shape and an outer surface that is located on the opposite side of the inner surface thereof and has a circular-arc shape. In this case, each of the inner surface of the first coupling member and that of the second coupling member has a circular-arc shape. Hence, it is possible to evenly produce gaps between the first coupling member and the spool and between the second coupling member and the spool. Thus, it is possible to produce the reel unit with a small size. Additionally, it becomes easy to fix the fishing rod attachment leg to the outer surface of the first coupling member.

The thinned part can include a plurality of pin-member passing through holes enabling a plurality of pin members for fixing the fishing rod attachment leg to pass therethrough. In this case, the pin members are disposed in the thinned part having a small thickness. Hence, a type of pin members having a short axial length can be herein used as the pin members herein mentioned, and thereby, a further lightweight construction is achieved.

A dual-bearing reel according to the present specification includes the aforementioned reel unit, the aforementioned spool and a handle. The handle is provided for rotating the spool, and is rotatably supported by the reel unit on the same side as the first side plate. In this case, it is possible to obtain the dual-bearing reel whereby the aforementioned advantageous effects can be achieved.

Overall, according to the present specification, it is possible to reduce the weight of a coupling member to which a fishing rod attachment leg is fixed, and simultaneously, to achieve the strength required for the coupling member in a reel unit for a dual-bearing reel.

BRIEF DESCRIPTION OF THE DRAWINGS

Referring now to the attached drawings which form a part of this original disclosure.

DETAILED DESCRIPTION OF EMBODIMENTS

Figure 1:
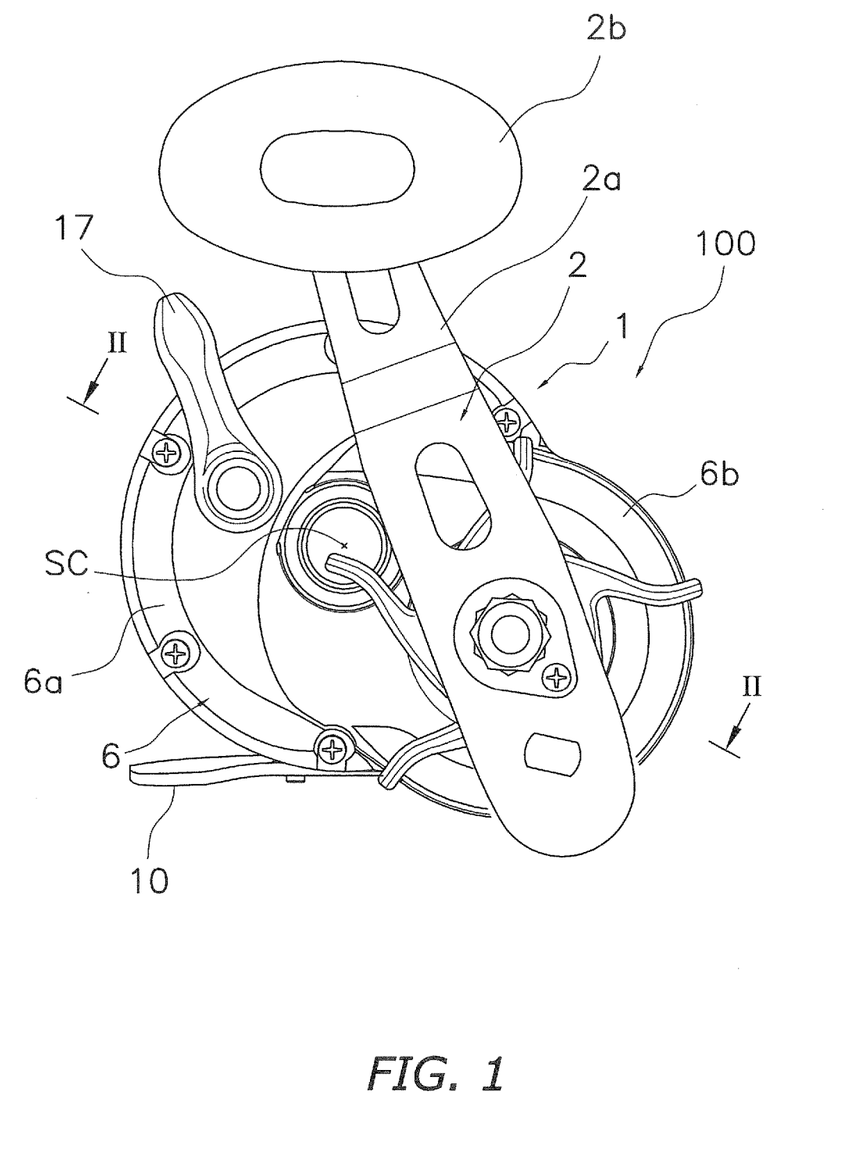
FIG. 1 is a left side view of a dual-bearing reel employing a preferred embodiment of the present specification.
Figure 2:
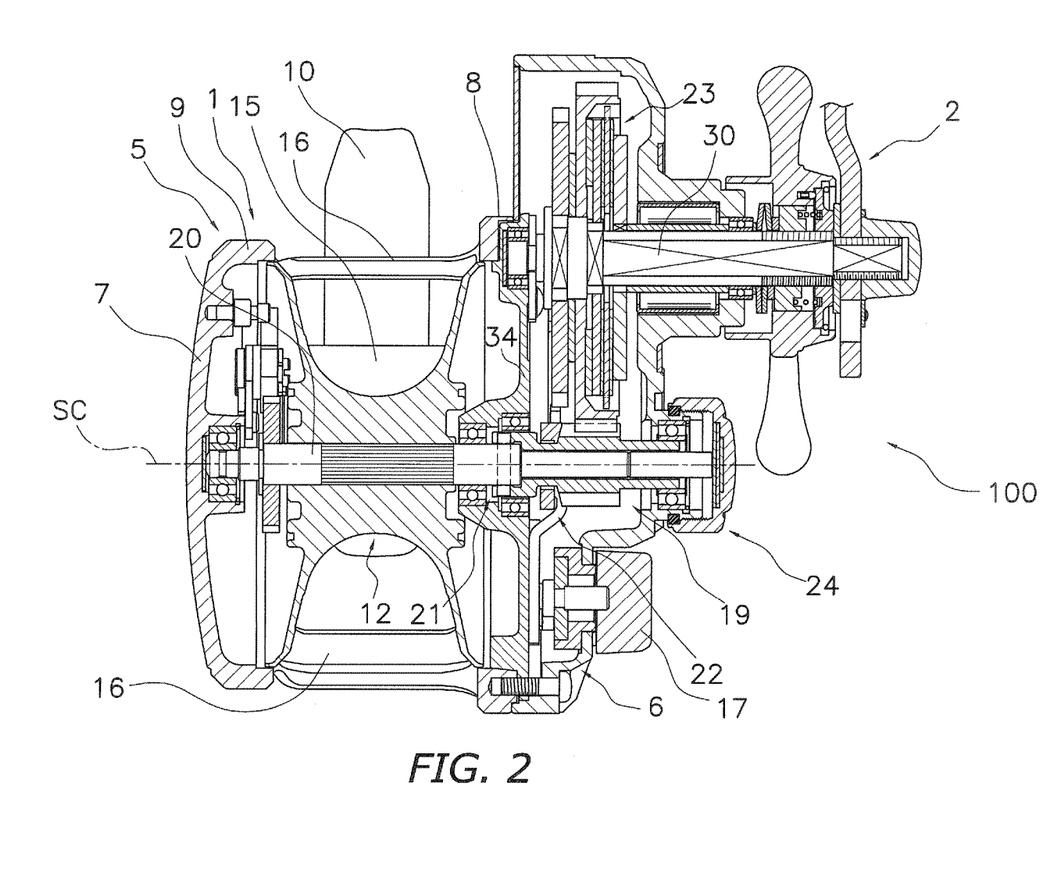
FIG. 2 is a cross-sectional view of the dual-bearing reel taken along cutaway line II-II in FIG. 1.

In FIGS. 1 and 2, a dual-bearing reel 100 employing a preferred embodiment of the present specification is a round reel in use for bait casting, jigging and so forth. The dual-bearing reel 100 includes a reel unit 1, a handle 2 for spool rotation and a spool 12. The handle 2 is disposed sideward of the reel unit 1. The spool 12 is rotatably mounted to the interior of the reel unit 1.

It should be noted that regarding the directional terms such as "front", "rear", "right" and "left" in the following explanation, the "front" direction means a direction of reeling out a fishing line in a condition that the dual-bearing reel 100 is mounted to a fishing rod, and the "right" and "left" directions refer to directions based on a condition that the dual-bearing reel 100 is seen from the "rear" side.

<Handle>

The handle 2 is of a single handle type including an arm 2a having the shape of a plate and a knob 2b rotatably mounted to the tip of the arm 2a. As shown in FIG. 2, the base end of the arm 2a is mounted to the tip of a drive shaft 30 to be described such that the arm 2a is unitarily rotatable with the drive shaft 30.

<Reel Unit>

The reel unit 1 is a member as shown in FIG. 2, and is made of, for instance, a light metal (e.g., an aluminum alloy, a magnesium alloy, etc.). The reel unit 1 includes a frame 5, first and second side covers 6 and 7 mounted to both sides of the frame 5, a fishing rod attachment leg 10 and a thinned part 11 (see FIGS. 3, 5 and 6). As shown in an enlarged view of FIG. 5, the reel unit 1 further includes a cover member 13 disposed on at least a part of the thinned part 11. The spool 12 is rotatably mounted to the interior of the reel unit 1 through a spool shaft 20. The spool shaft 20 is rotatably supported by the first side cover 6, the second side cover 7 and a mechanism mount plate 34 to be described.

The frame 5 is integrally formed by, for instance, die casting. As shown in FIGS. 3 to 6, the frame 5 includes a right and left pair of a first side plate 8 and a second side plate 9 and a plurality of (e.g., three) coupling members 14 coupling the first side plate 8 and the second side plate 9. Each of the first and second side plates 8 and 9 has a circular outer peripheral surface. The first side plate 8 is disposed on the handle 2 side, and has a larger diameter than the second side plate 9. The first side plate 8 has a circular opening 8a that enables the spool 12 to pass therethrough. The first side plate 8 and the second side plate 9 are opposed at a predetermined interval such that the spool 12 can be disposed therebetween. The mechanism mount plate 34 is a circular member on which a variety of mechanisms are mounted, and is detachably fixed to the first side plate 8 while being axis-aligned. The mechanism mount plate 34 supports the intermediate part of the spool shaft 20 and the base end of the drive shaft 30 such that the spool shaft 20 and the drive shaft 30 are rotatable. The mechanism mount plate 34 is fixed to the first side plate 8 by screws. The second side plate 9 is disposed on the opposite side of the handle 2. In the present preferred embodiment, the second side plate 9 is integrally formed with the second side cover 7.

Figure 5:
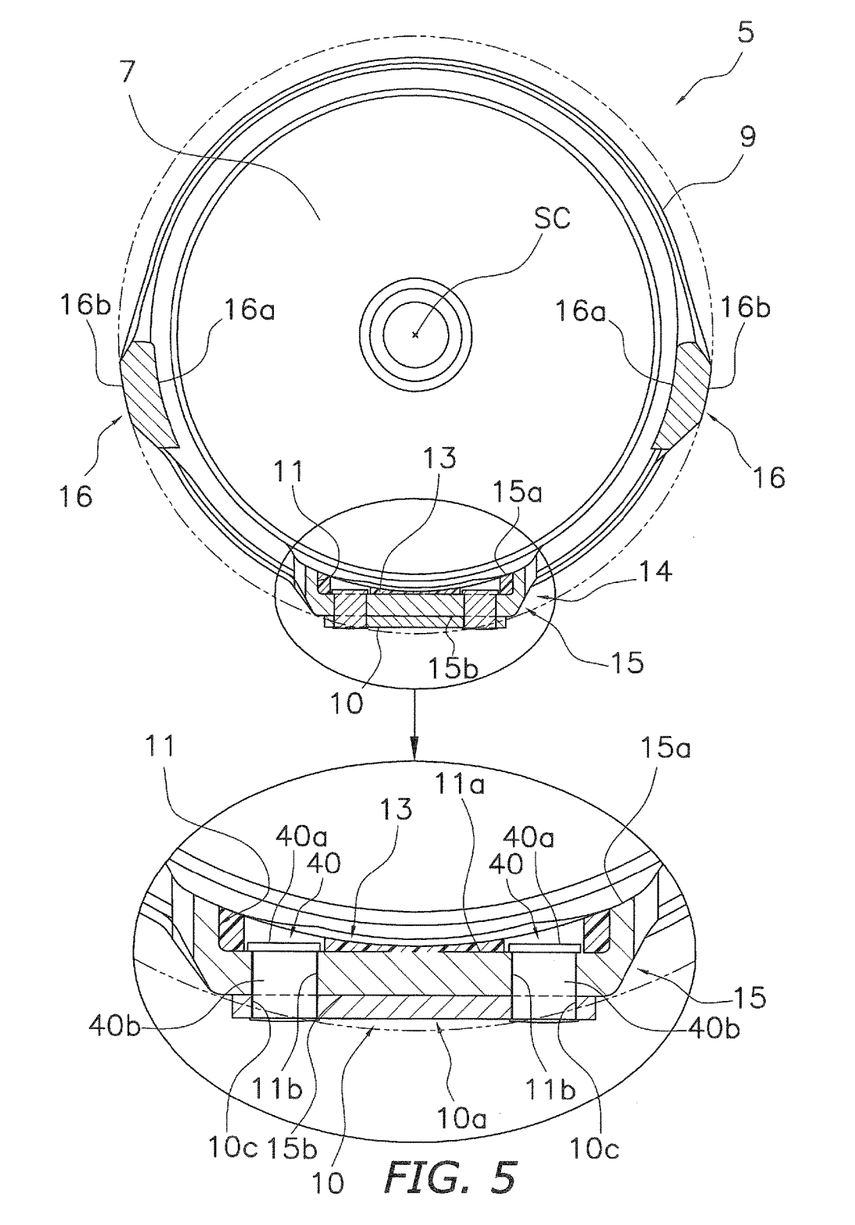
FIG. 5 is a cross-sectional view of the frame taken along cutaway line V-V in FIG. 3 and shows a condition of the frame to which the fishing rod attachment leg and a cover member are mounted.

The plural (e.g., three) coupling members 14 are integrally formed with the first side plate 8 and the second side plate 9. The plural coupling members 14 include a first coupling member 15 disposed on the bottom side and at least one second coupling member 16. In the present preferred embodiment, two second coupling members 16 are disposed back and forth. As shown in FIG. 5, the fishing rod attachment leg 10, made of, for instance, a metal (e.g., stainless alloy), is fixed to the first coupling member 15 by suitable pin members for fastening (e.g., screws, rivets, etc.). In the present preferred embodiment, the fishing rod attachment leg 10 is fixed to the first coupling member 15 by rivets 40 provided as the pin members. The rivets 40 are made of, for instance, an iron metal (e.g., stainless alloy). Each rivet 40 includes a head 40a and a shaft 40b having a smaller diameter than the head 40a. An inner surface 15a of the first coupling member 15, disposed closer to the spool 12, is recessed in the shape of a circular arc arranged about a rotational center SC of the spool 12. An outer surface 15b of the first coupling member 15, disposed on the opposite side of the inner surface 15a, is made in the form of a flat surface arranged orthogonally to a radial direction extending from the rotational center SC. The fishing rod attachment leg 10 is fixed to the outer surface 15b.

Each of inner surfaces 16a of the two second coupling members 16 is recessed in the shape of a circular arc arranged about the rotational center SC. Each of outer surfaces 16b of the two second coupling members 16 is bulged in the shape of a circular arc arranged about the rotational center SC. The outer surfaces 16b of the second coupling members 16 are formed approximately flush with an outer peripheral surface 8b of the first side plate 8, while curving on the second side plate 9 side toward the outer peripheral surface of the second side plate 9 having a small diameter.

As shown in FIG. 1, the first side cover 6 includes a circular part 6a and a bulging part 6b protruding outside and radially outward from the circular part 6a. The first side cover 6 is fixed to the first side plate 8 by a plurality of (e.g., five) screw members. The drive shaft 30, to the tip of which the handle 2 is unitarily rotatably coupled, is rotatably supported at the intermediate part thereof by the first side cover 6. The spool shaft 20 is rotatably supported at the right end thereof by the first side cover 6. A clutch lever 17 is mounted to the rear part of the first side cover 6. The second side cover 7 has a circular shape when seen from outside in a spool shaft direction. The spool shaft 20 is rotatably supported at the left end thereof by the second side cover 7.

Figure 4:
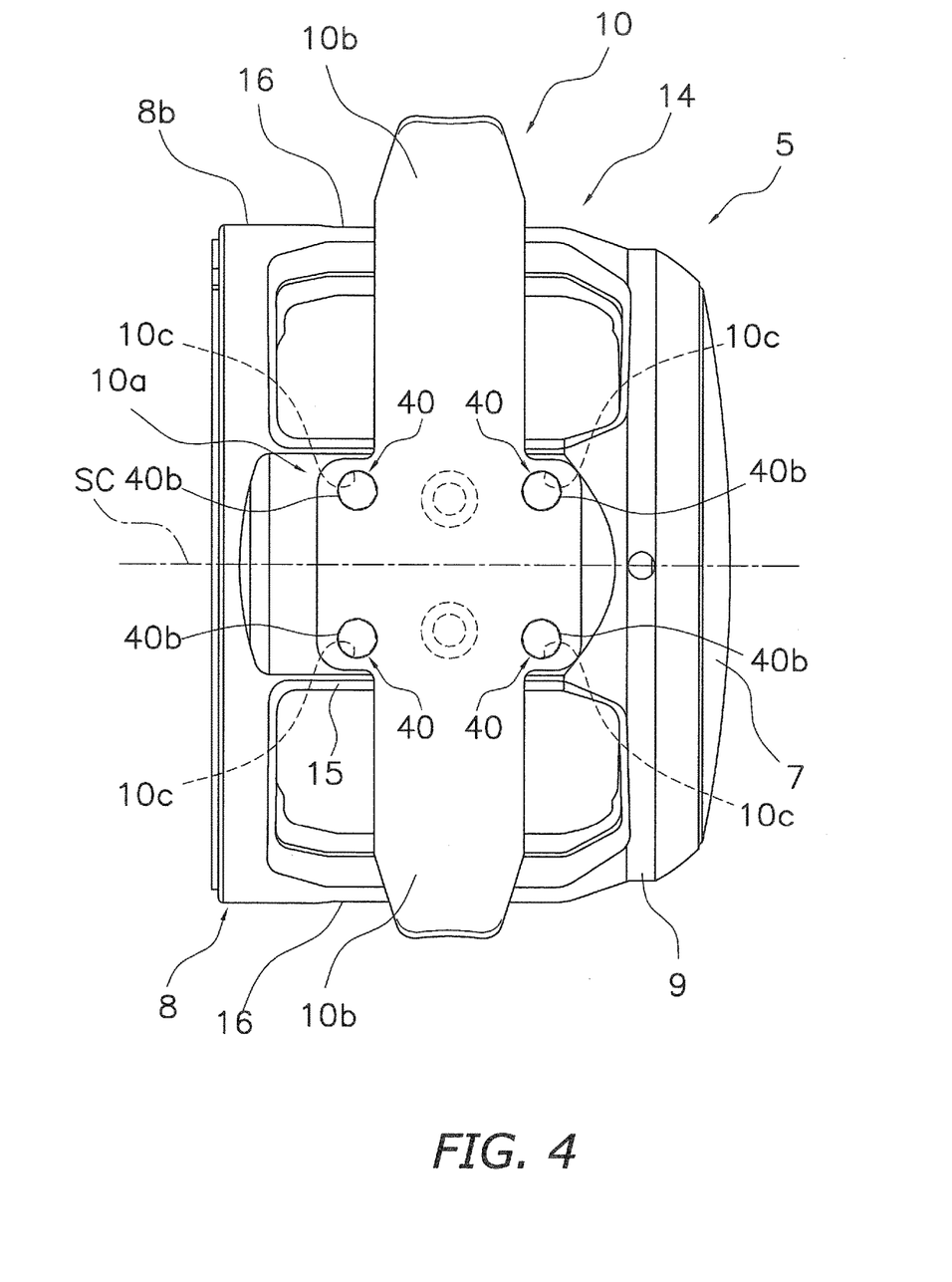
FIG. 4 is a bottom view of the frame to which a fishing rod attachment leg is mounted.

As shown in FIG. 4, the fishing rod attachment leg 10 is a member for attaching the dual-bearing reel 100 to the fishing rod and has the shape of a plate elongated back and forth. The fishing rod attachment leg 10 is a member made of a metal (e.g., stainless alloy). The fishing rod attachment leg 10 includes a fixed part 10*a* and a pair of legs 10*b*. The fixed part 10*a* is fixed to the outer surface 15*b* of the first coupling member 15. The pair of legs 10*b* extends back and forth from the fixed part 10*a*.

The fixed part 10*a* has the shape of a roughly rectangular flat plate having four rounded corners, and includes a plurality of (e.g., four) first passing through holes 10*c* bored in the four corners so as to enable the shafts 40*b* of the rivets 40 to pass therethrough. It should be noted that in FIG. 4, each of the shafts 40*b* of the rivets 40 is illustrated as having a larger diameter than each of the first passing through holes 10*c*. This indicates that each shaft 40*b* is plastically deformed at its tip when swaged to the fishing rod attachment leg 10. In other word, before being plastically deformed, each shaft 40*b* has a smaller diameter than each first passing through hole 10*c*. The pair of legs 10*b* has a smaller width than the fixed part 10*a*. Each of the pair of legs 10*b* has a tapered tip and curves in a circular-arc shape in the right-and-left direction so as to fit along the outer peripheral surface of the fishing rod.

Figure 3:
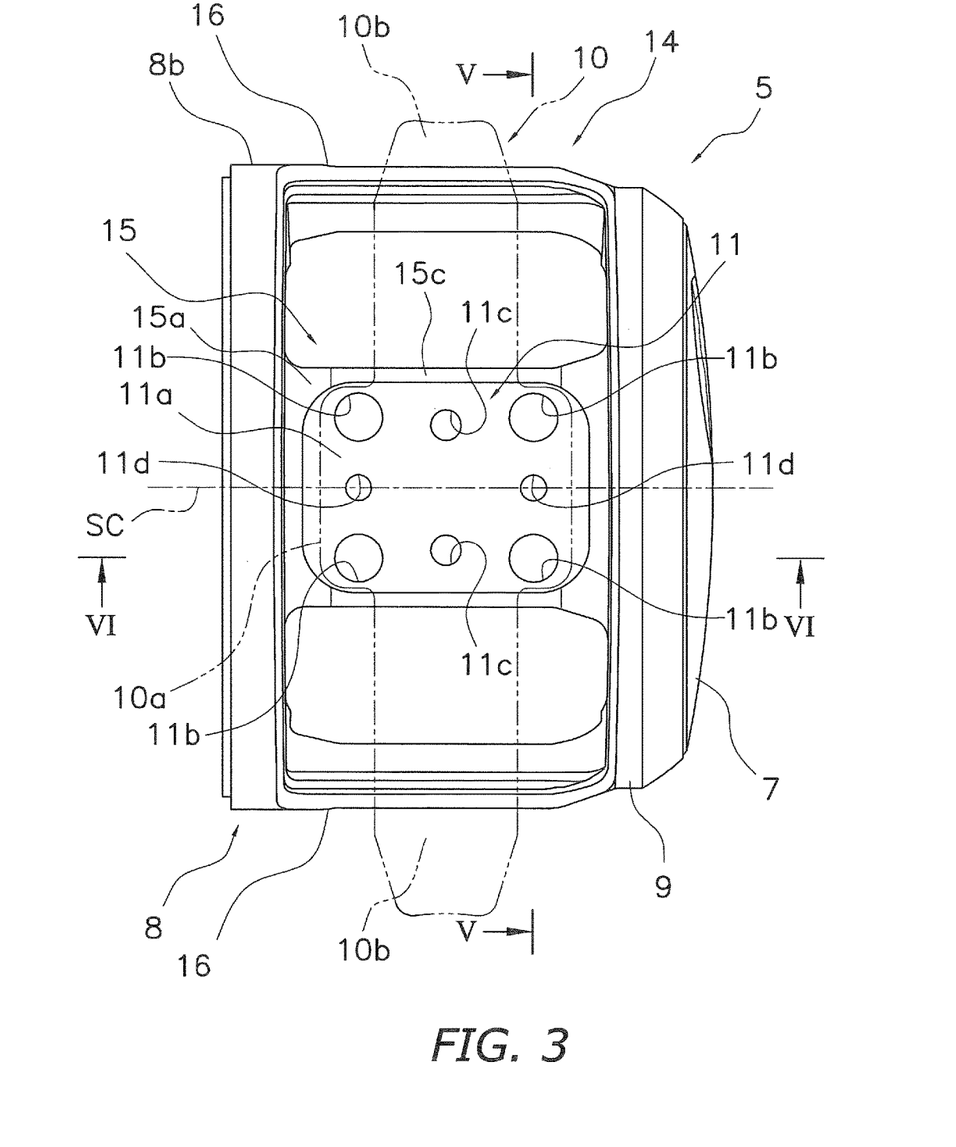
FIG. 3 is a plan view of a frame of a reel unit according to the preferred embodiment of the present specification.
Figure 6:
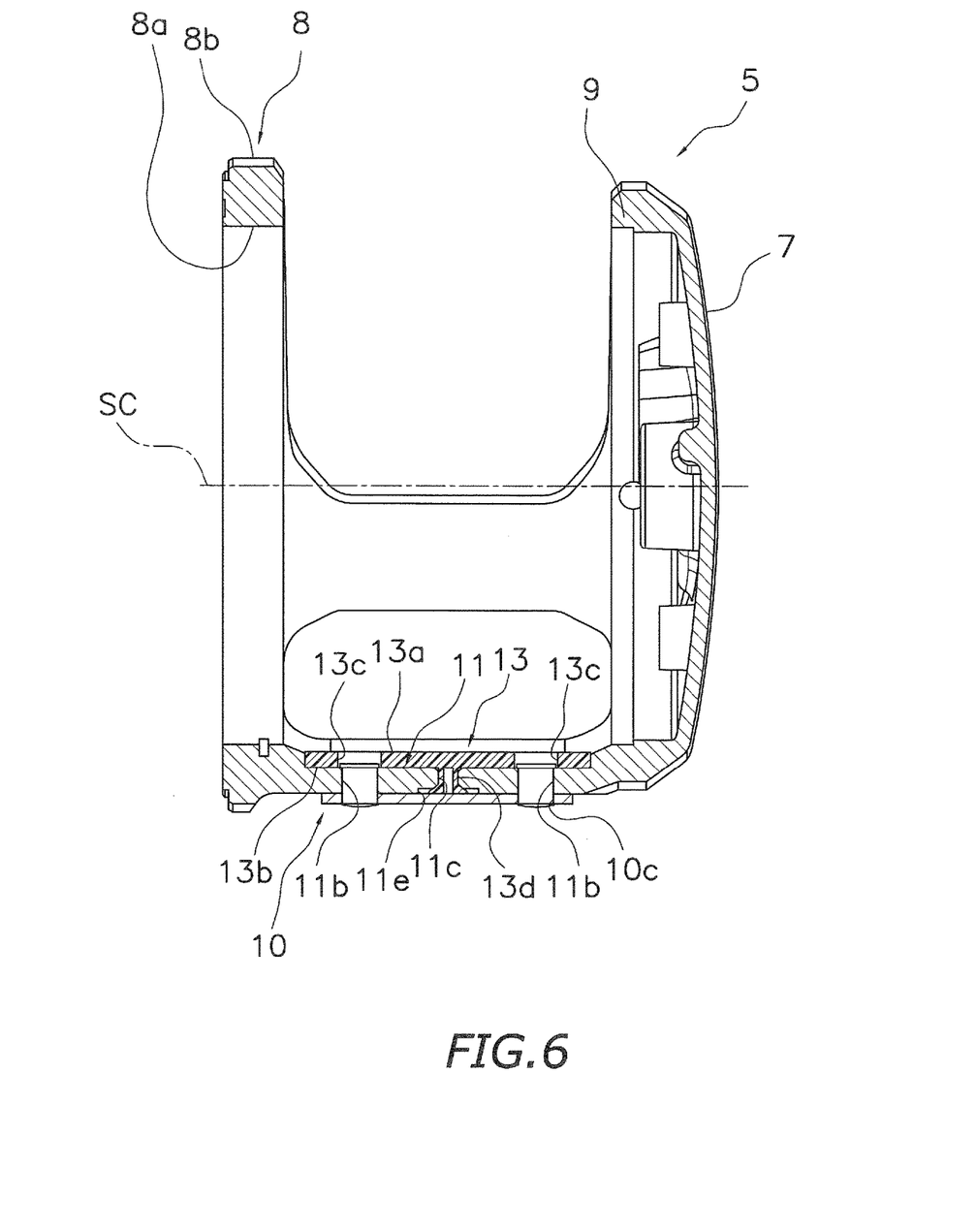
FIG. 6 is a cross-sectional view of the frame taken along cutaway line VI-VI in FIG. 3.
Figure 7:
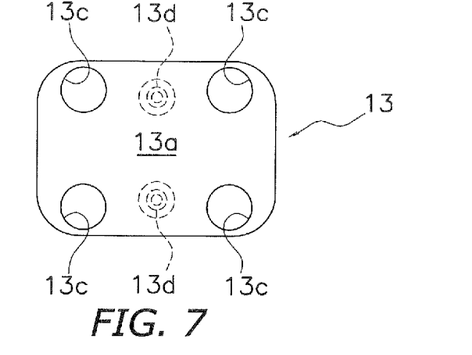
FIG. 7 is a plan view of the cover member.
Figure 8:
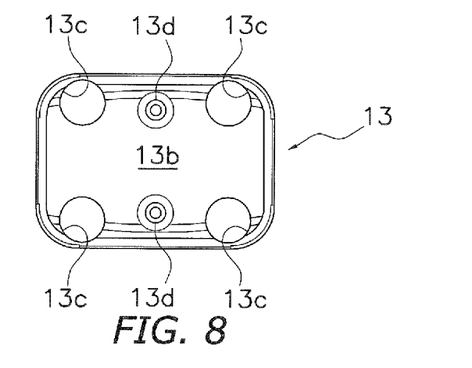
FIG. 8 is a bottom view of the cover member.
Figure 9:
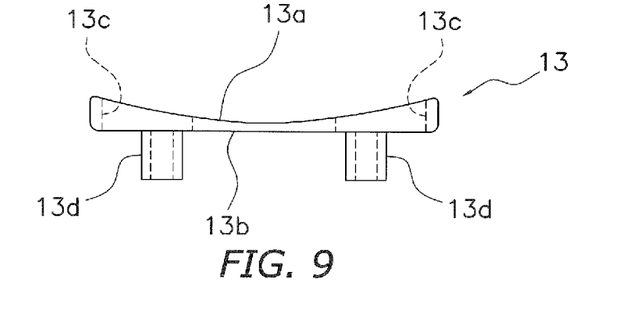
FIG. 9 is a side view of the cover member.

As shown in FIGS. 3, 5 and 6, the thinned part 11 is recessed in the shape of a box on the inner surface 15*a*, faced to the spool 12, of the first coupling member 15 to which the fishing rod attachment leg 10 is fixed. Therefore, a bottom 11*a* of the thinned part 11 is surrounded by an edge 15*c* disposed on four sides thereof. The edge 15*c* has a roughly rectangular shape and has a larger thickness than the bottom 11*a*. In the present preferred embodiment, the thinned part 11 is formed on the first coupling member 15 by machining (e.g., milling). The thinned part 11 is provided for reducing the weight of the first coupling member 15 to which the fishing rod attachment leg 10 is fixed, and simultaneously, for reliably achieving the strength required for the first coupling member 15. As shown in FIG. 3, the thinned part 11 includes a plurality of (e.g., four) second passing through holes 11*b*, at least one first through hole 11*c*, and at least one second through hole 11*d* bored for weight reduction. The plural second passing through holes 11*b* are holes for enabling the shafts 40*b* of the rivets 40 to pass therethrough. The plural second passing through holes 11*b* are bored in positions overlapping with those of the first passing through holes 10*c*, and each has a diameter equal to that of each first passing through hole 10*c*. The second passing through holes 11*b* are exemplary pin-member passing through holes. The first through holes 11*c* are holes for joining the cover member 13 to the first coupling member 15. Each first through hole 11*c* is disposed between each pair of the second passing through holes 11*b* aligned in the right-and-left direction. Each second through hole 11*d* is disposed between each pair of the second passing through holes 11*b* aligned in the back-and-forth direction. The first through holes 11*c* and the second through holes 11*d* are covered with the fixed part 10*a* of the fishing rod attachment leg 10.

The cover member 13 is a member constructed as shown in an enlarged view of FIG. 5, and is made of, for instance, a relatively hard synthetic resin such as ABS resin (acrylonitrile, butadiene, styrene copolymer synthetic resin). The cover member 13 covers at least a part of the thinned part 11, and is capable of hiding processing marks and cavities formed in casting. In the present preferred embodiment, the outer peripheral surface of the cover member 13 has a roughly rectangular shape with rounded corners, and is engaged with the inner edge of the thinned part 11. The cover member 13 is fixed to the thinned part 11 by a suitable fixation method (e.g., bonding, fastening with screws, welding, etc.). In the present preferred embodiment, the cover member 13 is fixed to the thinned part 11 by ultrasonic welding. It should be noted that grease is accumulated between the cover member 13 and the thinned part 11 in order to prevent galvanic corrosion. The construction can inhibit galvanic corrosion to be caused when the rivets 40 made of an iron metal are contacted to the first coupling member 15 and the fishing rod attachment leg 10 that are made of a light metal.

As shown in FIGS. 5 to 9, a first surface 13*a* of the cover member 13, disposed closer to the spool 12, is recessed in the shape of a circular arc arranged about the rotational center SC of the spool 12 so as to flush with the inner surface 15*a* of the first coupling member 15. A second surface 13*b* of the cover member 13, disposed on the opposite side of the first surface 13*a*, has a flat shape. The cover member 13 includes a plurality of (e.g., four) head mount holes 13*c* and a plurality of (e.g., two) joint protrusions 13*d*. Each head mount hole 13*c* has a larger diameter than the head 40*a* of each rivet 40. The joint protrusions 13*d* are formed on and protrude from the second surface 13*b*. The head mount holes 13*c* are bored in positions enabling the second passing through holes 11*b* to be communicated therewith. The head mount holes 13*c* penetrate the cover member 13 from the first surface 13*a* to the second surface 13*b*. Each joint protrusion 13*d* has a hollow tubular shape so as to be fittable into each first through hole 11*c*. The protruding length of each joint protrusion 13*d* is slightly shorter than the axial length of each first through hole 11*c*. A seating part 11*e*, having a large diameter, is formed about the outer surface 15*b*-side opening of each first through hole 11*c*. When the cover member 13 is joined to the thinned part 11 by ultrasonic welding, each joint protrusion 13*d* melts and pours into each seating part 11*e* whereby the cover member 13 is retained.

<Other Constituent Elements of Dual-Bearing Reel>

As shown in FIG. 2, a rotation transmission mechanism 19, a clutch mechanism 21, a clutch control mechanism 22, a drag mechanism 23 and a casting control mechanism 24 are disposed between the first side cover 6 and the mechanism mount plate 34. The rotation transmission mechanism 19 includes the drive shaft 30 and is configured to transmit a fishing-line winding directional rotation of the handle 2 to the spool 12. The drive shaft 30 is rotatably supported by the first side cover 6 and the mechanism mount plate 34. The clutch mechanism 21 is configured to couple/decouple the handle 2 and the spool 12 to/from each other. When the clutch mechanism 21 is set in a clutch-off state (disengaged state), the spool 12 is made freely rotatable. The clutch control mechanism 22 is configured to control and set the clutch mechanism 21 to be in a clutch-on state (engaged state) or the clutch-off state in accordance with an operation of the clutch lever 17. It should be noted that switching from the clutch-off state to the clutch-on state is also enabled by rotating the handle 2 in the fishing-line winding direction so as to actuate a return mechanism (not shown in the drawings) as well as by operating the clutch lever 17. The drag mechanism 23 is configured to brake a fishing-line releasing directional rotation of the spool 12. The casting control mechanism 24 is configured to regulate a resistive force to be applied during a rotation of the spool 12.

<Work for Attaching Fishing Rod Attachment Leg and Cover Member>

In fixing the fishing rod attachment leg 10 to the first coupling member 15, the shafts 40b of the rivets 40 are inserted into the second passing through holes 11b from the thinned part 11 side. Under the condition, the fixed part 10a of the fishing rod attachment leg 10 is mounted onto the shafts 40b of the rivets 40 while the heads 40a of the rivets 40 are supported by a desired fixture. Then, the tips of the shafts 40b are plastically deformed by a swaging device. Accordingly, the fishing rod attachment leg 10 is mounted to the first coupling member 15. When the fishing rod attachment leg 10 is mounted to the first coupling member 15, the first through holes 11c and the second through holes 11d are covered with the fixed part 10a. Under that condition, the two joint protrusions 13d are fitted into the first through holes 11c, and thus, the cover member 13 is fitted to the thinned part 11. Finally, the joint protrusions 13d are melted by an ultrasonic oscillator, and thus, the cover member 13 is ultrasonic-welded to the thinned part 11. Consequently, the fishing rod attachment leg 10 is fixed to the first coupling member 15.

<Features>

The aforementioned preferred embodiment can be expressed as follows.

(A) The reel unit 1 is a reel unit for the dual-bearing reel 100 supporting the spool 12 in a rotatable state. The reel unit 1 includes the frame 5, the fishing rod attachment leg 10 and the thinned part 11. The frame 5 includes the first side plate 8, the second side plate 9 disposed in opposition to the first side plate 8 so as to enable the spool 12 to be disposed between the first side plate 8 and the second side plate 9, and the plural coupling members 14 integrally formed with the first side plate 8 and the second side plate 9 so as to couple the first side plate 8 and the second side plate 9. The fishing rod attachment leg 10 is fixed to the outer surface 15b of the first coupling member 15 included in the plural coupling members 14. The thinned part 11 has a box-like recessed shape and is formed on the inner surface 15a, faced to the spool 12, of the first coupling member 15 to which the fishing rod attachment leg 10 is fixed.

In the present reel unit 1 of the dual-bearing reel 100, the first side plate 8 and the second side plate 9 are integrally formed, and the thinned part 11, having a box-like recessed shape, is formed on the inner surface 15a of the first coupling member 15 to which the fishing rod attachment leg 10 is fixed. The edge 15c, having a large diameter, is formed in the surroundings of the thinned part 11 having a box-like recessed shape, and is integrally formed with the bottom 11a having a small thickness. Hence, compared to a through hole, a degradation in bending strength does not occur in the thinned part 11. Therefore, it is possible to reduce the weight of the first coupling member 15 to which the fishing rod attachment leg 10 is fixed, and simultaneously, to reliably achieve the strength required for the first coupling member 15.

(B) The reel unit 1 may further include the cover member 13 disposed in at least a part of the thinned part 11. In this case, even in the construction that the cover member 13 is disposed in the thinned part 11, it is possible to reduce the total weight of the cover member 13 and the first coupling member 15 by producing the cover member 13 made of a synthetic resin having a smaller specific gravity than metal. Additionally, the cover member 13 is disposed in at least a part of the thinned part 11. Hence, grease can be accumulated in the interior of the cover member 13 in order to prevent galvanic corrosion.

(C) Each of the first side plate 8 and the second side plate 9 may include an outer peripheral surface having a circular shape. In this case, it is possible to reduce the weight of the first coupling member 15 to which the fishing rod attachment leg 10 is fixed, and simultaneously, to reliably achieve the strength required for the first coupling member 15 in the round reel unit 1.

(D) The plural coupling members 14 may include the first coupling member 15 to which the fishing rod attachment leg 10 is fixed and at least one second coupling member 16. Each second coupling member 16 may have the inner surface 16a having a circular-arc shape and the outer surface 16b that is located on the opposite side of the inner surface 16a and has a circular-arc shape. The first coupling member 15 may include the inner surface 15a having a circular-arc shape and the outer surface 15b that is located on the opposite side of the inner surface 15a and is made in the form of a flat surface arranged orthogonally to a radial direction. In this case, each of the inner surface 15a of the first coupling member 15 and the inner surface 16a of the second coupling member 16 has a circular-arc shape. Hence, it is possible to evenly produce gaps between the first coupling member 15 and the spool 12 and between the second coupling member 16 and the spool 12. Thus, it is possible to produce the reel unit 1 with a small size. Additionally, it becomes easy to fix the fishing rod attachment leg 10 to the outer surface 15b of the first coupling member 15.

(E) The thinned part 11 may include the plural second passing through holes 11b enabling the plural rivets 40 for fixing the fishing rod attachment leg 10 to pass therethrough. In this case, the rivets 40 are disposed in the thinned part 11 having a small thickness. Hence, a type of rivets having a short axial length can be herein used as the rivets 40, and thereby, a further lightweight construction can be achieved.

Other Preferred Embodiments

One preferred embodiment of the present specification has been explained above. However, the present specification is not limited to the above, and a variety of changes can be made without departing from the scope of the present specification. Especially, a plurality of preferred embodiments and modifications described in the present specification can be arbitrarily combined on an as-needed basis.

(a) In the aforementioned preferred embodiment, the present specification has been explained by exemplifying the reel unit 1 of the round dual-bearing reel 100. However, the application target of the present specification is not limited to the above. For example, the present specification is similarly applicable to a reel unit of a low profile non-round dual-bearing reel.

(b) In the aforementioned preferred embodiment, the thinned part 11 is formed on the inner surface 15a of the first coupling member 15. Alternatively, the thinned part 11 may be formed on the outer surface 15b of the first coupling member 15.

(c) In the aforementioned preferred embodiment, the second side plate 9 and the second side cover 7 are integrally formed. However, the second side cover 7 may be a discrete member provided separately from the second side plate 9.

What is claimed is:

1. A reel unit for a dual-bearing reel, the reel unit for supporting a spool in a rotatable state, the reel unit comprising:
a frame including a first side plate, a second side plate disposed in opposition to the first side plate to enable the spool to be disposed between the first side plate and the second side plate, and a plurality of coupling members integrally formed with the first side plate and the second side plate to couple the first side plate and the second side plate;
a fishing rod attachment leg fixed to an outer surface of one of the plurality of coupling members; and
a thinned part having a recessed shape and formed on an inner surface of the one of the coupling members to which the fishing rod attachment leg is fixed, the inner surface faced to the spool, wherein a bottom of the thinned part is surrounded by an edge disposed on four sides of the thinned part.

2. The reel unit according to claim 1, further comprising:
a cover member disposed in at least a part of the thinned part.

3. The reel unit according to claim 2, wherein the cover member is made of a synthetic resin.

4. The reel unit according to claim 1, wherein each of the first side plate and the second side plate includes an outer peripheral surface having a circular shape.

5. The reel unit according to claim 4, wherein
the plurality of coupling members include a first coupling member and at least one second coupling member, the first coupling member corresponding to the one of the coupling members to which the fishing rod attachment leg is fixed,
the first coupling member includes the inner surface and the outer surface located on the opposite side of the inner surface, the inner surface having a circular-arc shape, the outer surface being in the form of a flat surface arranged orthogonally to a radial direction, and
the second coupling member includes an inner surface and an outer surface located on the opposite side of the inner surface thereof, the inner surface of the second coupling member having a circular-arc shape, the outer surface of the second coupling member having a circular-arc shape.

6. The reel unit according to claim 1, wherein the thinned part includes a plurality of pin-member passing through holes enabling a plurality of pin members for fixing the fishing rod attachment leg to pass therethrough.

7. A dual-bearing reel, comprising:
a reel unit, the reel unit for supporting a spool in a rotatable state, the reel unit including
a frame including a first side plate, a second side plate disposed in opposition to the first side plate to enable the spool to be disposed between the first side plate and the second side plate, and a plurality of coupling members integrally formed with the first side plate and the second side plate to couple the first side plate and the second side plate;
a fishing rod attachment leg fixed to an outer surface of one of the plurality of coupling members; and
a thinned part having a recessed shape and formed on an inner surface of the one of the coupling members to which the fishing rod attachment leg is fixed, the inner surface faced to the spool, wherein a bottom of the thinned part is surrounded by an edge disposed on four sides of the thinned part,
the spool; and
a handle for rotating the spool, the handle rotatably supported by the reel unit on the same side as the first side plate.

8. The dual-bearing reel according to claim 7, further comprising:
a cover member disposed in at least a part of the thinned part.

9. The dual-bearing reel according to claim 8, wherein the cover member is made of a synthetic resin.

10. The dual-bearing reel according to claim 7, wherein each of the first side plate and the second side plate includes an outer peripheral surface having a circular shape.

11. The dual-bearing reel according to claim 10, wherein
the plurality of coupling members include a first coupling member and at least one second coupling member, the first coupling member corresponding to the one of the coupling members to which the fishing rod attachment leg is fixed,
the first coupling member includes the inner surface and the outer surface located on the opposite side of the inner surface, the inner surface having a circular-arc shape, the outer surface being in the form of a flat surface arranged orthogonally to a radial direction, and
the second coupling member includes an inner surface and an outer surface located on the opposite side of the inner surface thereof, the inner surface of the second coupling member having a circular-arc shape, the outer surface of the second coupling member having a circular-arc shape.

12. The dual-bearing reel according to claim 7, wherein the thinned part includes a plurality of pin-member passing through holes enabling a plurality of pin members for fixing the fishing rod attachment leg to pass therethrough.

13. A method of manufacturing a reel unit for a dual-bearing reel, the reel unit for supporting a spool in a rotatable state, the method comprising:
disposing, in a frame including a first side plate, a second side plate in opposition to the first side plate to enable the spool to be disposed between the first side plate and the second side plate, a plurality of coupling members integrally formed with the first side plate and the second side plate to couple the first side plate and the second side plate;
fixing a fishing rod attachment leg to an outer surface of one of the plurality of coupling members; and
forming a thinned part, having a recessed shape, on an inner surface of the one of the coupling members to which the fishing rod attachment leg is fixed, the inner surface faced to the spool, wherein a bottom of the thinned part is surrounded by an edge disposed on four sides of the thinned part.

14. The method according to claim 13, further comprising:
disposing a cover member in at least a part of the thinned part.

15. The method according to claim 14, wherein the cover member is made of a synthetic resin.

16. The method according to claim 13, wherein each of the first side plate and the second side plate includes an outer peripheral surface having a circular shape.

17. The method according to claim 16, wherein
the plurality of coupling members include a first coupling member and at least one second coupling member, the first coupling member corresponding to the one of the coupling members to which the fishing rod attachment leg is fixed, the first coupling member includes the inner surface and the outer surface located on the opposite side of the inner surface, the inner surface having a circular-arc shape, the outer surface being in the form of a flat surface arranged orthogonally to a radial direction, and
the second coupling member includes an inner surface and an outer surface located on the opposite side of the inner surface thereof, the inner surface of the second coupling member having a circular-arc shape, the outer surface of the second coupling member having a circular-arc shape.

18. The method according to claim 13, wherein the thinned part includes a plurality of pin-member passing through holes enabling a plurality of pin members for fixing the fishing rod attachment leg to pass therethrough.

* * * * *